United States Patent
Kumar Somayajula et al.

(10) Patent No.: US 8,849,708 B2
(45) Date of Patent: Sep. 30, 2014

(54) DEVICE CUSTOMIZATION DURING ORDER FULFILLMENT UTILIZING AN EMBEDDED ELECTRONIC TAG

(71) Applicant: Amazon Technologies, Inc., Reno, NV (US)

(72) Inventors: Siva Rama Kumar Somayajula, Palo Alto, CA (US); Varadarajan Gopalakrishnan, Cupertino, CA (US); Kiran Kumar Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/715,878

(22) Filed: Dec. 14, 2012

(65) Prior Publication Data

US 2014/0172620 A1   Jun. 19, 2014

(51) Int. Cl.
*G06Q 30/00* (2012.01)
*G06Q 30/06* (2012.01)

(52) U.S. Cl.
CPC .................... *G06Q 30/0621* (2013.01)
USPC ......................................................... 705/26.5

(58) Field of Classification Search
CPC .................................................. G06Q 30/0621
See application file for complete search history.

(56) References Cited

U.S. PATENT DOCUMENTS

| 2007/0162731 A1* | 7/2007 | Toy et al. ...................... 713/1 |
| 2008/0204199 A1* | 8/2008 | Howarth et al. ............. 340/10.1 |
| 2009/0254857 A1* | 10/2009 | Romine et al. ................ 715/810 |

OTHER PUBLICATIONS

Rackley, Steve., "Near Field Communications", Portable Design. (Sep. 2008): 22, 24-26.*

* cited by examiner

*Primary Examiner* — William Allen
*Assistant Examiner* — Anand Loharikar
(74) *Attorney, Agent, or Firm* — Lowenstein Sandler LLP

(57) ABSTRACT

A method for customizing a device during order fulfillment is described. A radio frequency identification (RFID) tag of an electronic device is wirelessly loaded with customization information at an order fulfillment center without disturbing packaging surrounding the electronic device or without powering up the electronic device.

17 Claims, 5 Drawing Sheets

DEVICE CUSTOMIZATION DURING ORDER FULFILLMENT UTILIZING AN EMBEDDED ELECTRONIC TAG

BACKGROUND

A large and growing population of users enjoys entertainment through the consumption of digital media items, such as music, movies, images, electronic books and so on. Users employ various electronic devices to consume such media items. Among these electronic devices are electronic book readers, cellular telephones, personal digital assistants (PDAs), portable media players, tablet computers, netbooks and the like. A typical problem that users of small, portable electronic devices face is that programming the device to access a home wireless local area network of the user may be difficult.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

Embodiments of a method for customizing an electronic device during order fulfillment are described. The method includes pre-programming an electronic device at a factory, warehouse, supply depot or other shipping location before the electronic device is shipped to the ordering customer (or other intended recipient).

The electronic device may be so programmed while the electronic device remains in its packaging by loading customization information into a radio frequency identification (RFID) tag included in the electronic device using an RFID device located at the fulfillment center. Customization information that may be loaded into the electronic device may include, e.g., information regarding the customer's home wireless local area network (LAN) such that, when the customer receives the electronic device, it can readily connect with the customer's home network without further configuration. Other customization information may be loaded into the electronic device as described in detail below.

Figure 1:
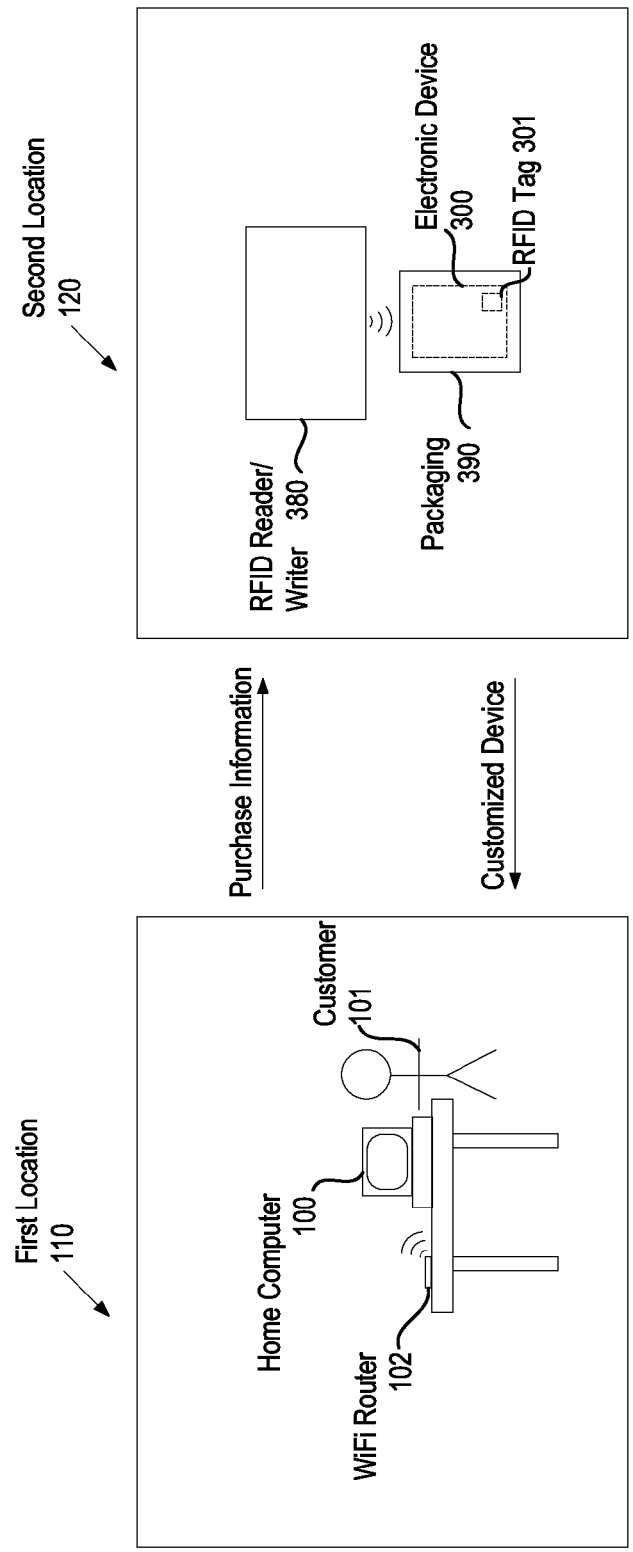
FIG. 1 illustrates an application of a method of customizing a device during order fulfillment.

FIG. 1 illustrates an application of a method of customizing an electronic device 300 during order fulfillment. FIG. 1 illustrates a customer 101 in a first location 110 using a home computer 100 to place an order for the electronic device 300 by submitting a request to purchase the electronic device 300. The customer 101, for example, may submit the request via a webpage. As part of the submission of the request, the customer 101 may also submit customization information. The customization information may include, for example, information regarding a wireless LAN router 102, such as a network identifier (e.g., an SSID [Service Set Identifier]), a password (e.g., a WPA [WI-FI Protected Access] password), or other network credentials. The wireless LAN router 102 may be a WI-FI router that operates according to IEEE 802.11 standards. The wireless LAN router 102 may use Bluetooth or other wireless communication technologies. The customization information may include other information as described below.

Purchase information, including information regarding the purchase-request and the customization information, is transmitted to a second location 120 which may be a fulfillment center (e.g., a factory, warehouse, supply depot or other shipping location). Although not shown in FIG. 1, it is to be appreciated that the purchase information may not be directly transmitted to the second location 120. In one embodiment, the purchase information is transmitted to a third location before being forwarded to the second location 120. In one embodiment, the third location may determine which fulfillment center to send the purchase information to have the order fulfilled.

There may be a plurality of electronic devices of various types located at the second location 120. Each of the plurality of electronic devices may be packaged in packaging to prevent damage to the electronic device during storage or transport. The packaging 390 may include, for example, cardboard, styrofoam, plastic or other materials. The packaging 390 may completely enclose the electronic device such that none of the electronic device is exposed. At the second location 120, the electronic device 300 is selected, based on the purchase-request, to fulfill the order.

The packaging 390 enclosing the electronic device 300 may impede the loading of information into the electronic device 300 using typical methods, e.g. using a keypad of the electronic device or an input port. Further, the electronic device 300 may be configured to prevent accidental powering up of the device during storage and transport. For example, a battery of the electronic device 300 may be physically separated from contacts leading to the remainder of the electronic device 300 by a pull-tab to be removed by the customer 101 upon receipt of the electronic device 300. This may also impede the loading of information into the electronic device 300 using typical methods. Further, even if the electronic device 300 is configured in such way that it may be turned on at the second location 120, powering up the electronic device 300 and/or using typical methods of loading information into the electronic device 300 may be disadvantageous. For example, customization at the second location 120 using typical methods may be overly costly.

However, the electronic device 300 may include an electronic tag, such as a radio frequency identification (RFID) tag 301, embedded in the electronic device 300 that can be wirelessly programmed while the electronic device 300 is still enclosed in associated packaging 390. In particular, the RFID tag 301 can be loaded with information without disturbing the packaging 390 by wireless transmitting the information through the packaging 390. Further, the RFID tag 301 may be wirelessly programmed without powering up other components of the electronic device 300. Thus, in one embodiment, at the second location 120, an RFID device 380 is used to load the customization information into the electronic device 300. In particular, the RFID device 380 is used to load the customization information into the RFID tag 301 of the electronic device 300. The RFID device 380 may include an RFID reader, an RFID writer, or both. The RFID device 380 may be a two-way communication device that can both read information from and write information to the RFID tag 301.

Thus, the customization information can be loaded into the electronic device 300 without unpackaging the electronic device 300, without removing the electronic device 300 from its packaging 390, and without disturbing the packaging 390 in any way. Further, the customization information can be loaded into the electronic device 300 without drawing power from a battery of the electronic device 300 and without running or drawing power into a processing device of the electronic device 300.

Once the customization information has been loaded into the electronic device 300, the customized electronic device is shipped to the ordering customer 101 at the first location 110. In one embodiment, the electronic device 300, enclosed in its packaging 390, is further packaged in a shipping box or other container. In one embodiment, the electronic device 300 is shipped to a different location than the first location 110. For example, the electronic device 300 may be shipped to a different location as a gift or the electronic device may be ordered from a customer's office and shipped to the customer's home.

When the customer 101 (or gift recipient) receives the customized electronic device 300, removes it from the packaging 390, and turns it on, the electronic device 300 automatically connects to the customer's wireless LAN through the wireless LAN router 102 using the customization information pre-programmed into the electronic device 300.

Figure 2:
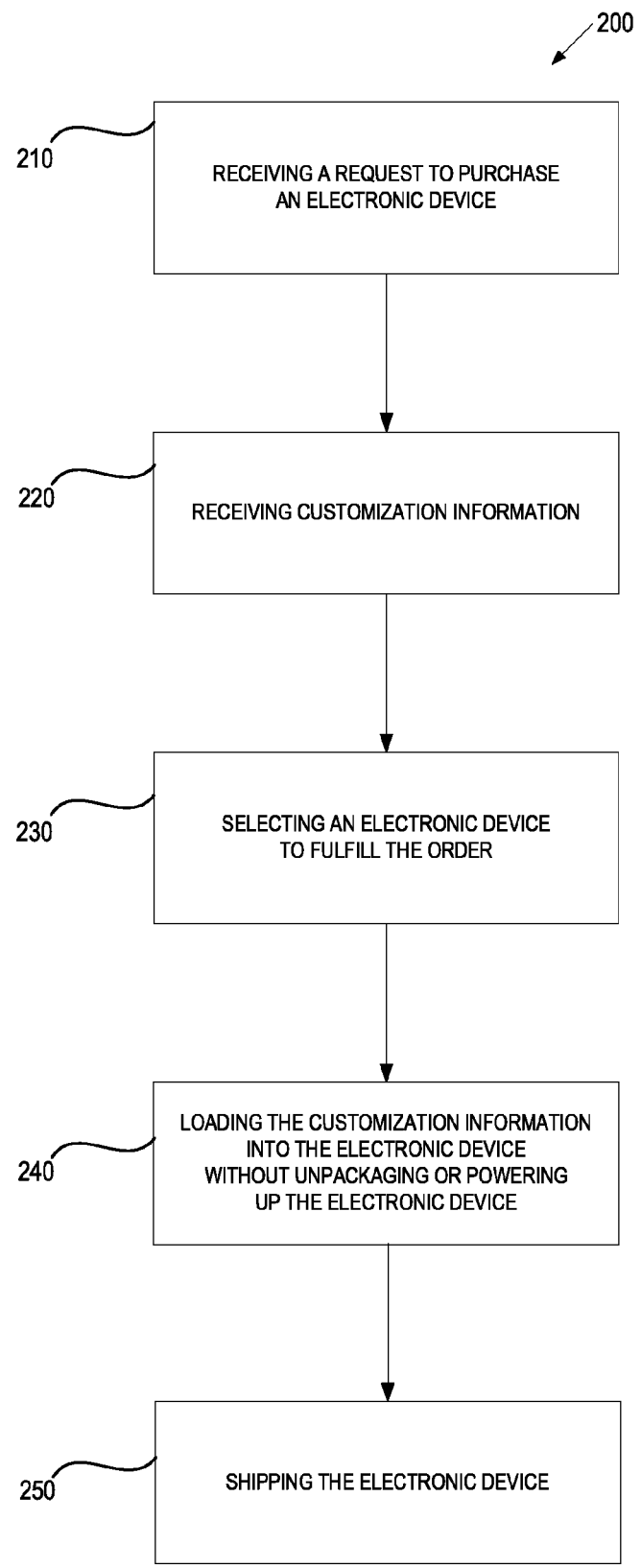
FIG. 2 illustrates a flowchart of an embodiment of a method of customizing a device during order fulfillment.

FIG. 2 illustrates a flowchart of an embodiment of a method 200 of customizing an electronic device during order fulfillment. The method 200 begins, in block 210, with receiving a request to purchase an electronic device. The request may be received at a fulfillment center, such as a factory, a warehouse, a supply depot or other shipping center. The request may be received from a customer via a webpage. The request may include information about the electronic device, such as a model identifier or information regarding a size of a storage device within the electronic device.

In block 220, customization information is received. The customization information may be received along with the request or separate from the request. The customization information is associated with the request and/or the electronic device specified by the request. The customization information may include wireless network configuration information for allowing the given electronic device to connect to wireless network using the wireless network configuration information, account login information for allowing the given electronic device to access an account using the account login information, location information for allowing the given electronic device to determine a location of the given electronic device using the location information, or a startup message for allowing the given electronic device to display the startup message upon being powered up The customization information may include information about wireless LAN, such as a network identifier (e.g., an SSID [Service Set Identifier]), a password (e.g., a WPA [WI-FI Protected Access] password), or other network credentials. The customization information may include other wireless network information. The customization information may include 3G/4G cellular information (which may be based on the customer's address) to enable cellular communication when the electronic device is first removed from its packaging and powered up. The customization information may include information for automatically configuring the electronic device to communicate over a GSM (Global System for Mobile Communications), W-CDMA (Wideband Code Division Multiple Access), or other cellular communication systems. Alternatively, other types of communication system information may be included in the customization information.

The customization information may also include account login information such as a username and password. The customization information may include account login information for multiple accounts. The accounts may include accounts for online retail stores, including but not limited to the store to which the received purchase-request was submitted. The accounts may include e-mail accounts. The accounts may include other types of accounts.

Figure 5:
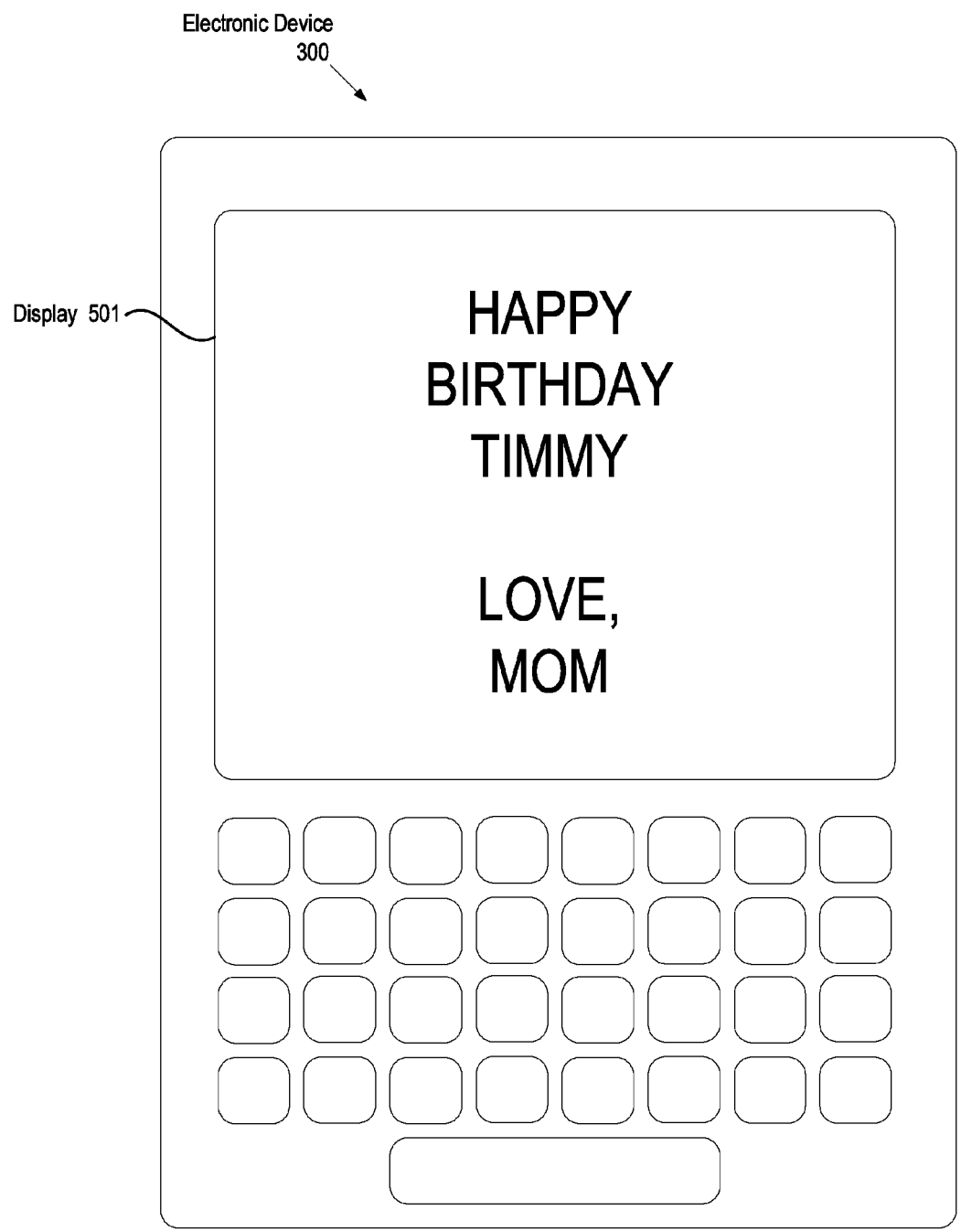
FIG. 5 illustrates the display of an exemplary startup message on an electronic device.

The customization information may include a customized startup message to be displayed when the electronic device is powered up. For example, a customer may customize the startup message to say "Happy Birthday" when ordering an electronic device intended as a gift. When the customization information includes a startup message, the electronic device may be programmed to automatically display the startup message when the electronic device is powered up. FIG. 5 illustrates the display of an exemplary startup message on an electronic device. In particular, the electronic device 300 includes a display 501 that displays the startup message when the electronic device 300 is powered up. In one embodiment, the startup message is displayed only the first time the electronic device is powered up. In another embodiment, the startup message is displayed every time the electronic device is powered up until the electronic device is otherwise configured.

The customization information may include location information. For example, the customization information may be an address, e.g., the shipping address to which the electronic device is being shipped. The customization information may include location information based on the shipping address, such as a coarse GPS location, a state, or a time zone. Alternatively, other types of location information or may be included in the customization information.

The customization information may include any of the above-discussed information or any combination thereof. The customization information may, in addition to or instead of the information discussed above, include other types of information.

In block 230, a given electronic device is selected to fulfill the request. The electronic device may be selected from a plurality of packaged electronic devices at the fulfillment center. Each of the plurality of electronic devices may be packaged in packaging to prevent damage to the electronic device during storage or transport. The packaging may include, for example, cardboard, styrofoam, plastic or other materials. The electronic device may be selected based on the request to fulfill it. For example, an electronic device having a model type specified by the request may be selected or an electronic device including a storage device having a size specified by the request may be selected.

In block 240, the customization information is loaded into the electronic device without unpackaging the electronic device or without powering up the electronic device. In one embodiment, the customization information is loaded without unpackaging the electronic device and without powering up the electronic device. In another embodiment, the customization information is loaded without unpackaging the electronic device, but while still powering up the electronic device. In yet another embodiment, the customization information is loaded by unpackaging the electronic device, but without powering up the electronic device.

As noted above, in one embodiment, the customization information is loaded without unpackaging the electronic device and without powering up the electronic device. This can be performed by using an RFID device to transmit information to an RFID tag of the electronic device. The RFID tag may be a passive tag which can harvest power from the electromagnetic field produced by the RFID device. In one embodiment, the RFID tag is a near field communication (NFC) tag that does not require power from the main battery of the electronic device and does not require an active interface with the main processing device of the electronic device. In one embodiment, the RFID tag includes at least one of a battery separate from the main battery of the electronic device or a processing device separate from the main processing device of the electronic device.

Thus, by using an RFID device, the customization information can be wirelessly transmitted through the packaging enclosing the electronic device and loaded into the electronic device. Further, because the RFID tag does not require an active interface with the main processing device and does not require power from the main battery, the customization information can be loaded into the electronic device without powering up the device.

As noted above, in other embodiments, the customization information is loaded without unpackaging the device, but with powering up the device or with unpackaging the device, but without powering up the device. In one embodiment, the packaging surrounding the electronic device is disturbed to expose an external contact of the electronic device. The external contact is electrically connected to an internal tag that, upon being powered via the contact, stores customization information transmitted via the contact. Thus, unlike the technique described above, the customization information is not transmitted wirelessly or through the packaging; however, it is loaded into the electronic device without powering up the electronic device. In another embodiment, the electronic device is fully powered up via wireless induction through the packaging such that the main processing device is fully functional. In this powered up state, the customization information is loaded into the main memory of the electronic device by the main processing device via a wireless receiver of the electronic device. Thus, unlike the technique described above, the customization information is loaded into the device by powering up the electronic device; however, it is loaded into the electronic device without unpackaging the electronic device or otherwise disturbing the packaging.

Other techniques of loading the customization information into the electronic device may be used.

In one embodiment, the customization information is encrypted before being loaded into the electronic device. Thus customization information may be encrypted such that it can only be read (and understood) by the main processing device of the electronic device and not by outside eavesdroppers with access to RFID reader. In one embodiment, the customization information is encrypted with a symmetric key accessible by the main processing device (e.g., stored in a memory coupled to the main processing device). In another embodiment, the customization information is encrypted with a public key corresponding to a private key stored in the main processing device of the electronic device. Alternatively, the customization information can be encrypted or privatized in other ways.

In block 250, the customized electronic device is shipped. In one embodiment, the electronic device is shipped to the customer. In another embodiment, the electronic device is shipped to a gift recipient. The destination address of the shipment may be received as part of the purchase-request. Shipping the electronic device may include packaging the electronic device (already enclosed in packaging) in a shipping box or other container.

Figure 3:
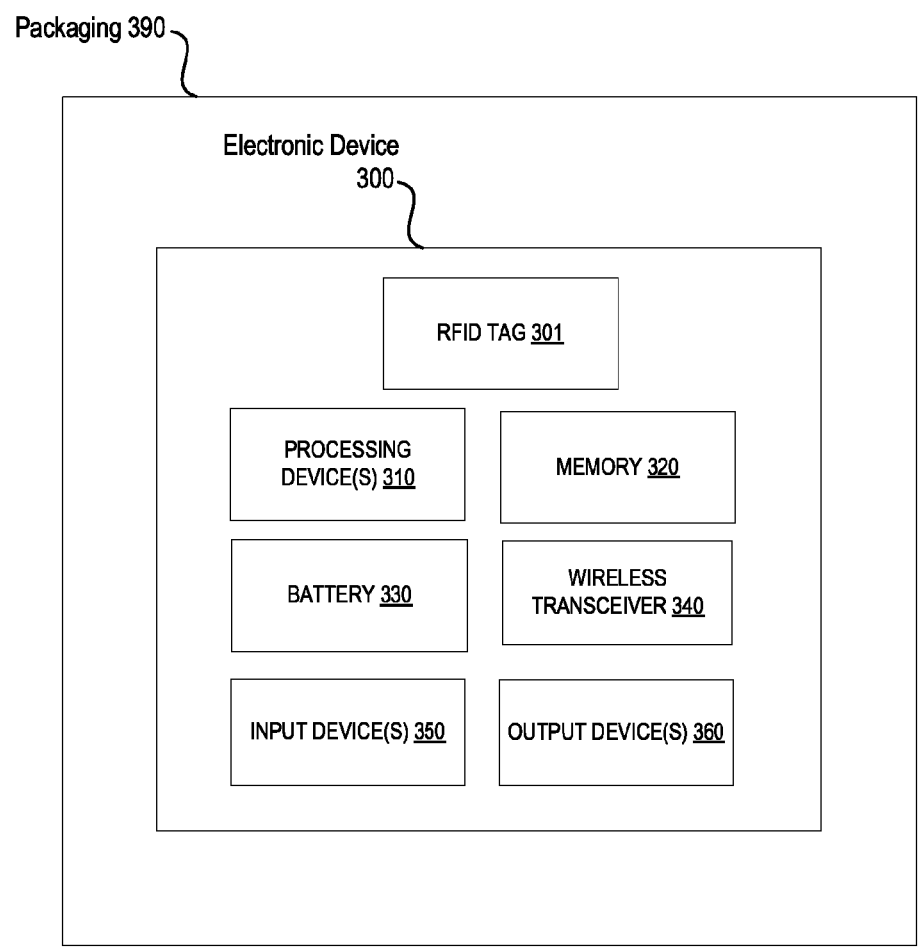
FIG. 3 illustrates a functional block diagram of an embodiment of an electronic device.

FIG. 3 illustrates a functional block diagram of an embodiment of an electronic device 300. The electronic device 300 may be any type of computing device such as an electronic book reader, a PDA, a mobile phone, a laptop computer, a portable media player, a tablet computer, a smart phone, a camera, a video camera, a netbook, a desktop computer, a gaming console, a digital video disc (DVD) player, a computing pad, a media center and the like.

The electronic device 300 is enclosed in packaging 390. The packaging 390 may prevent damage to the electronic device 300 during storage or transport. The packaging 390 may include, for example, cardboard, styrofoam, plastic or other materials. The packaging 390 may completely enclose the electronic device such that none of the electronic device 300 is exposed when the packaging 390 is undisturbed.

The electronic device 300 includes various components coupled via one or more buses (not shown). The electronic device 300 includes one or more processing devices 310, such as one or more central processing units (CPUs), microcontrollers, field programmable gate arrays or other types of processing devices. The processing devices 310 include a main processing device. The main processing device may be a host processing device or may be the most computationally powerful processing device. The main processing device may include multiple processing devices.

The electronic device 300 also includes device memory 320, in data communication with the processing devices 310, which may correspond to any combination of volatile and/or non-volatile storage devices. The device memory 320 may include one or more of read-only memory (ROM), flash memory, dynamic random access memory (DRAM) such as synchronous DRAM (SDRAM)), and static random access memory (SRAM)). The device memory 320 stores information which provides an operating system component, and various program modules. The electronic device 300 performs functions by using the processing device(s) 310 to execute instructions provided by the device memory 320. The system memory 320 may include one or more types of removable storage and/or one or more types of non-removable storage. The system memory 120 may include a computer-readable storage medium on which is stored one or more sets of instructions embodying any one or more of the methodologies or functions described herein.

The electronic device 300 includes a battery 330 for providing power to the various other components of the electronic device 300. The battery 330 may a rechargeable or a non-rechargeable battery. The battery 330 may include an interface for connecting to an external power supply to recharge the battery 330. The processing device 310 may determine a charge level of the battery 330. The battery 330 may include multiple batteries. The battery 330 includes a main battery used to power at least the main processing device. The main battery may include multiple batteries.

The electronic device includes a wireless transceiver 340 for wirelessly receiving and/or transmitting information. The wireless transceiver 340 may be configured to communicate according to an IEEE 802.11 standard. The wireless transceiver 340 may be configured to communicate according to cellular (e.g., 3G/4G) standard. The wireless transceiver 340 may be configured to wirelessly communicate using other standards.

The electronic device 300 may also include one or more input devices 350. The input devices 350 may include a keyboard, a mouse device, specialized selection keys, sensors, or other input devices. The electronic device 100 may also include one or more output devices 360. The output devices 320 may include displays, printers, audio output devices (such as a speaker 322), or other output devices. In one embodiment, a single device (e.g., a touch screen) may be both an input device 350 and an output device 360.

The electronic device 300 includes a RFID tag 301. The RFID tag 301 may comprise a uCode tag sold by NXP. In one embodiment, the RFID tag 301 is an NFC tag. In one embodiment, the RFID tag 301 operates at approximately 13.56 megahertz (MHz). In one embodiment, the RFID tag is an ultra-high frequency (UHF) RFID tag that operates between 860 MHz to 960 MHz. In other embodiments, the RFID tag operates at other frequencies. For example, the RFID tag may operate in a range between 120 kilohertz (kHz) to 150 kHz, at approximately 13.56 MHz, at approximately 433 MHz, between 2450 MHz and 5800 MHz, or between 3.1 gigahertz (GHz) and 10 GHz.

The RFID tag 301 may be both readable and writable. The RFID tag 301 may be a write once read many (WORM) tag. The RFID tag 301 may be re-writable.

The RFID tag 301 may communicate according to one or more RFID standards. The RFID tag 301 may communication according to one or more NFC standards. In one embodiment, the RFID tag 301 uses magnetic induction between an antenna of the RFID tag 301 and another antenna of an RFID device, each located within each other's near field, effectively forming an air-core transformer. In one embodiment, the RFID tag 301 has a working distance up to about 4 centimeters. In another embodiment, the RFID tag 301 has a working distance up to about 20 centimeters. In one embodiment, the RFID tag receives data at 106, 212, or 424 kbits/s. Alternatively, in other embodiments, the RFID communication system may have different working distances and communication at different data rates than those mentioned above.

Figure 4:
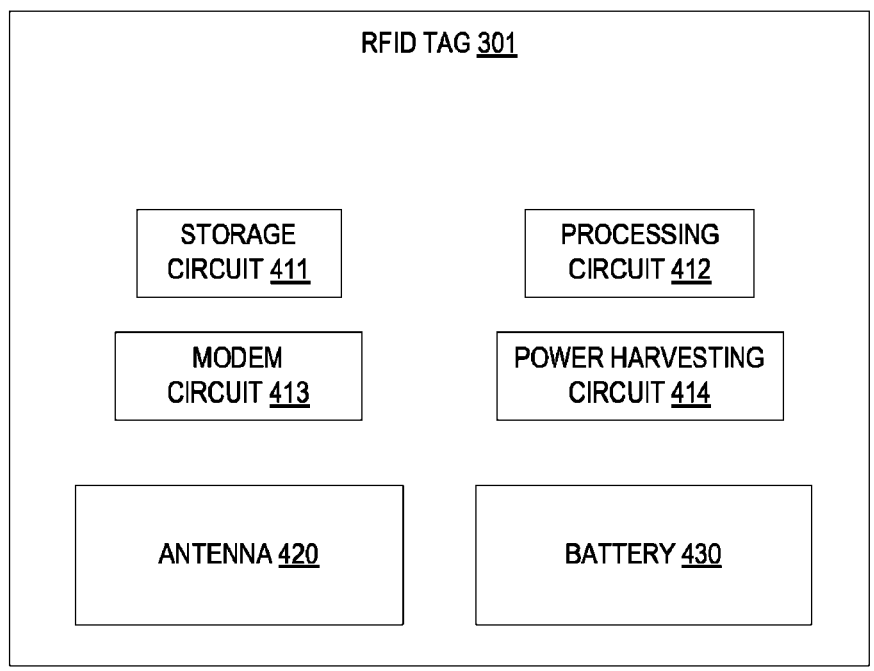
FIG. 4 illustrates a functional block diagram of an embodiment of a radio frequency identification (RFID) tag.

FIG. 4 illustrates a functional block diagram of an embodiment of an RFID tag 301. The RFID tag 301 may include multiple components. The RFID tag may include one or more circuits including at least one of a storage circuit 411 for storing information, a processing circuit 412 for processing information, a modem circuit 413 for modulating and demodulating a radio-frequency signal, a power harvesting circuit 414 for collecting direct current (DC) power from a reader signal, or other circuits performing other functions. The one or more circuits may be embodied as a single integrated circuit, on different die substrates in a common carrier package, or on different carrier packages. The RFID tag 301 may also include an antenna 420 for receiving and transmitting a data signal. The RFID tag 301 may be a passive tag that does not include a battery, but draws power from signals transmitted to the RFID tag 301. Alternatively, in another embodiment, the RFID tag 301 may be an active tag that includes a battery 430 for powering various components, such as an integrated circuit. In other embodiments, the RFID tag 301 may include fewer or additional components to those described above.

The RFID tag 301 may be powered alternatively by the electromagnetic field when it receives and stores the customization information at the fulfillment center and by the battery 340 when the customization information is read by the processing device 330 when the electronic device 300 is powered up by the customer.

The foregoing description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of embodiments of the present invention.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

It is to be understood that the above description is intended to be illustrative and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A method of customizing an electronic device during order fulfillment, the method comprising:
  receiving, from a customer, a request to purchase the electronic device;
  receiving, from the customer in association with the request, information comprising wireless network configuration information of a wireless network associated with the customer;
  storing, by a processing device, the information received from the customer in association with the request;
  selecting the electronic device to fulfill the order from among a plurality of packaged electronic devices;
  wirelessly transmitting the information received from the customer into a passive radio frequency identification (RFID) tag embedded in the electronic device, while the electronic device is still enclosed in associated packaging; and
  shipping the electronic device to the customer, wherein the electronic device is configured to, upon being powered up, read the wireless network configuration information from the RFID tag to configure the electronic device to access the wireless network associated with the customer.

2. The method of claim 1, wherein the wireless network configuration information comprises at least one of wireless local area network (WLAN) configuration information or cellular network configuration information.

3. The method of claim 1, wherein the information further comprises at least one of account login information for allowing the electronic device to access an account using the account login information, location information for allowing the electronic device to determine a location of the electronic device using the location information, or a startup message for allowing the electronic device to display the startup message upon being powered up.

4. A method comprising:
  receiving, from a customer, a request to purchase an electronic device;
  receiving, from the customer, information to be transmitted into the electronic device, the information comprising a message to be displayed upon startup;
  storing, by a processing device, the information received from the customer in association with the request;
  selecting a given electronic device to fulfill the request from among a plurality of packaged electronic devices;

wirelessly transmitting the information received from the customer into an electronic tag embedded in the given electronic device, while the given electronic device is still enclosed in associated packaging; and shipping the given electronic device to the customer, wherein the given electronic device is configured to, upon being powered up, read the information comprising the message to be displayed upon startup from the electronic tag to configure the given electronic device to display the message upon startup.

5. The method of claim 4, wherein the information is wirelessly transmitted into the electronic tag embedded in the given electronic device without disturbing the associated packaging.

6. The method of claim 4, wherein wirelessly transmitting the information into the electronic tag comprises transmitting the information through packaging completely enclosing the given electronic device.

7. The method of claim 4, wherein the electronic tag comprises a radio frequency identification (RFID) tag.

8. The method of claim 4, wherein the electronic tag comprises a near field communication (NFC) tag.

9. The method of claim 4, wherein the electronic tag comprises a passive RFID tag.

10. The method of claim 4, wherein wirelessly transmitting the information into the electronic tag comprises wirelessly powering the electronic tag such that the electronic tag is powered without drawing power to a main processing device of the given electronic device.

11. The method of claim 4, wherein wirelessly transmitting the information into the electronic tag comprises wirelessly powering the electronic tag such that the electronic tag is powered without drawing power from a main battery of the given electronic device.

12. The method of claim 4, further comprising encrypting the information before wirelessly transmitting the information into the electronic tag and wherein wirelessly transmitting the information comprises wirelessly transmitting the encrypted information.

13. A method comprising:

receiving, from a customer, a request to purchase an electronic device;

receiving, from the customer, information to be loaded into the electronic device, the information comprising account login information;

storing, by a processing device, the information received from the customer in association with the request;

selecting a given electronic device to fulfill the request, the given electronic device comprising a main processing device and a main battery;

wirelessly transmitting the information received from the customer into an electronic tag embedded in the given electronic device without drawing power to the main processing device or from the main battery; and shipping the given electronic device to the customer, wherein the given electronic device is configured to, upon being powered up, read the information comprising the account login information from the electronic tag to configure the given electronic device to access an account using the account login information.

14. The method of claim 13, wherein the electronic tag comprises a radio frequency identification (RFID) tag, the RFID tag comprising at least one of an RFID processing device or an RFID battery, wherein loading the information into the given electronic device comprises drawing power to the RFID processing device or from the RFID battery.

15. The method of claim 13, wherein wirelessly transmitting the information into the electronic tag comprises wirelessly transmitting the information, while the given electronic device is still enclosed in associated packaging through the packaging.

16. The method of claim 13, wherein the given electronic device is configured to access the loaded information with the main processing device when the electronic device is powered up by the main battery.

17. The method of claim 16, further comprising encrypting the information with a key before loading the information into the given electronic device, wherein loading the information comprises loading the encrypted information, and wherein the given electronic device is configured to access the loaded information with the main processing device using a corresponding key.

* * * * *